United States Patent
Tanaka et al.

(10) Patent No.: US 7,037,386 B2
(45) Date of Patent: May 2, 2006

(54) ROLLING BEARING FOR CONTINUOUSLY VARIABLE TRANSMISSION

(75) Inventors: Susumu Tanaka, Kanagawa (JP);
Nobuaki Mitamura, Kanagawa (JP);
Hiromichi Takemura, Kanagawa (JP);
Yoshitaka Hayashi, Kanagawa (JP);
Yasuo Murakami, Kanagawa (JP)

(73) Assignee: NSK Ltd., Tokyo (JP)

( * ) Notice: Subject to any disclaimer, the term of this patent is extended or adjusted under 35 U.S.C. 154(b) by 239 days.

(21) Appl. No.: 10/410,342

(22) Filed: Apr. 10, 2003

(65) Prior Publication Data

US 2003/0219178 A1    Nov. 27, 2003

(30) Foreign Application Priority Data

Apr. 15, 2002 (JP) .......................... P 2002-112291
Feb. 20, 2003 (JP) .......................... P 2003-042948

(51) Int. Cl.
*C22C 38/24* (2006.01)
*C22C 38/46* (2006.01)

(52) U.S. Cl. ...................... 148/319; 148/906; 384/625; 384/912

(58) Field of Classification Search ................ 148/333, 148/906, 319; 384/625, 912
See application file for complete search history.

(56) References Cited

U.S. PATENT DOCUMENTS

| | | | |
|---|---|---|---|
| 5,147,140 A | 9/1992 | Murakami et al. | |
| 5,292,200 A | 3/1994 | Matsumoto et al. | |
| 5,338,377 A | 8/1994 | Mitamura et al. | |
| 5,800,637 A * | 9/1998 | Yamamura et al. | 148/318 |
| 6,342,109 B1 | 1/2002 | Takemura et al. | |
| 6,409,846 B1 * | 6/2002 | Takemura et al. | 148/325 |
| 6,440,232 B1 * | 8/2002 | Takemura et al. | 148/319 |
| 6,565,677 B1 * | 5/2003 | Takemura et al. | 148/325 |

FOREIGN PATENT DOCUMENTS

| | | |
|---|---|---|
| JP | 63-34423 | 7/1988 |
| JP | 11-199983 A | 7/1999 |
| JP | 2000-328203 | 11/2000 |
| JP | 2001032900 | * 2/2001 |
| JP | 2001323939 | * 11/2001 |

* cited by examiner

*Primary Examiner*—Deborah Yee
(74) *Attorney, Agent, or Firm*—Sughrue Mion, PLLC

(57) ABSTRACT

A rolling bearing for belt-type continuously variable transmission with a metal belt including pieces has an inner ring; an outer ring; and rolling elements, wherein at least one of the inner ring, the outer ring and the rolling element is made of an iron alloy having a chromium content of from 2.5 to 20.0% by weight.

2 Claims, 3 Drawing Sheets

ROLLING BEARING FOR CONTINUOUSLY VARIABLE TRANSMISSION

BACKGROUND OF THE INVENTION

1. Field of the Invention

The present invention relates to improvements in belt-type continuously variable transmissions comprising a metal belt including pieces for automobile and realizes a structure which stabilizes the friction coefficient of belt with pulley, inhibits the effect of collision of elements constituting the belt with each other and resonance of the belt with the elements and the pulley during transmission, gives a high transmission efficiency and prolonged life even when a low viscosity CVT fluid or ATF oil is used for high fuel efficiency, and prevents early exfoliation of rolling bearing for bearing pulley and rolling bearing disposed in units during their operation.

2. Description of the Related Art

In recent years, there has been a growing demand for higher automobile fuel efficiency from the standpoint of environmental protection. The recent trend is for more belt-type continuously variable transmissions (B-CVT) having a higher efficiency to be used rather than related art multistage automatic transmission (AT). Various belt-type continuously variable transmissions have been developed. For example, the metal belt-type continuously variable transmission 1 schematically shown in FIG. 1 has an input side rotary shaft 10 and an output side rotary shaft 20 which are disposed in parallel to each other. The input side rotary shaft 10 is born by a pair of rolling bearings 11, 11 and rotationally driven by an engine 30 via a torque converter 31 and a start clutch such as solenoid clutch 32. On the other hand, the output side rotary shaft 20 is rotatably born by a pair of rolling bearings 21, 21 inside a transmission case (not shown). The rotation of the output side rotary shaft 20 is transmitted to a pair of right and left drive wheels 25, 25 via a reduction gear train 22 and a differential gear 23.

Disposed in the middle portion of the input side rotary shaft 10 is a driving pulley 40 so that the driving pulley 40 and the input side rotary shaft 10 rotate in synchronism with each other. The clearance between a pair of driving pulley plates 41, 41 constituting the driving pulley 40 can be freely adjusted by a driving dislocation unit 42. In other words, the groove width of the driving pulley 40 can be freely raised or reduced by the driving dislocation unit 42. On the other hand, disposed in the middle portion of the output side rotary shaft 20 is a driven pulley 50 so that the driven pulley 50 and the output side rotary shaft 20 rotate in synchronism with each other. The clearance between a pair of driven pulley plates 51, 51 constituting the driven pulley 50 can be freely adjusted by a driven dislocation unit 52. In other words, the groove width of the driven pulley 50 can be freely expanded or shrunk by the driven dislocation unit 52. An endless metal belt with pieces 60 extends over the driven pulley 40 and the driving pulley 50. The metal belt with pieces 60 comprises an endless combination of a number of piece shaped metallic elements.

In operation, the belt-type continuously variable transmission 1 comprising a metal belt with pieces 60 having the aforementioned constitution allows the power transmitted from the engine 30 to the input side rotary shaft 10 via the start clutch to be transmitted to the driven pulley 50 via the metal belt with pieces 60. As examples of the metal belt with pieces 60 there has heretofore been known one which transmits power in the pushing direction and one which transmits power in the pulling direction. In any case, the power transmitted to the driven pulley 50 is then transmitted from the output side rotary shaft 20 to the drive wheels 25, 25 via the reduction gear train 22 and the differential gear 23. In order to change the reduction ratio from the input side rotary shaft 10 to the output side rotary shaft 20, the groove width of the driving pulley 40 and the driven pulley 50 are raised or reduced in relation to each other.

For example, in order to raise the reduction ratio from the input side rotary shaft 10 to the output side rotary shaft 20, the groove width of the driving pulley 40 is raised while the groove width of the driven pulley 50 is reduced. As a result, the diameter of the circle formed by the metal belt with pieces 60 on the pulleys 40, 50 is small on the driving pulley part and large on the driven pulley part, giving a reduction ratio from the input side rotary shaft 10 to the output side rotary shaft 20. On the contrary, in order to raise the multiplication ratio (reduce the reduction ratio) from the input side rotary shaft 10 to the output side rotary shaft 20, the groove width of the driving pulley 40 is reduced while the groove width of the driven pulley 50 is raised.

For transmission between the element formed by the piece metal constituting the metal belt with pieces 60 and the driving and driven pulleys 40, 50, the belt frequency f (Hz) can be represented by the equation $f \text{ (Hz)} = Zb \times Nb/60$ in which $Zb$ represents the number of belt elements and $Nb$ represents the rotary speed of belt. For example, in the case where the number of belt elements (metallic tops) is from 250 to 400, when the rotary speed of the engine is changed from 600 $\text{min}^{-1}$ to 7,000 $\text{min}^{-1}$, the primary shaft shows a phenomenon that the primary component of the frequency of vibration caused by the running of the belt is from 1,000 to 3,000 Hz during deceleration but in a range as high as 10,000 to 35,000 Hz during acceleration. On the other hand, MT and AT show a phenomenon that the primary frequency of vibration caused by the engagement of gears is lower on both low and high gear ratio sides than belt-type continuously variable transmissions because they normally have 50 or less gears.

Another characteristic of the belt-type continuously variable transmission 1 comprising a metal belt with pieces 60 is thought that the friction coefficient of the metal belt with pieces 60 with the driving and driven pulleys 40, 50 changes by a range of from 0.1 to 0.15 unlike MT and AT. Since actual belt running involves repetition of multiplication and reduction, resonance attributed to the metal belt with pieces 60 can occur. This resonance frequency is determined by the length of the metal belt with pieces 60 and the tension of the belt. However, since the actual operation gives a vibration having a wide range of frequency, a high frequency acts on the interior of the unit, particularly the rolling bearings 11, 21 for bearing the driving and driven pulleys 40, 50, respectively, when the resonance frequency of the belt is often passed.

Accordingly, since the friction coefficient of the metal belt with pieces 60 with the driving and driven pulleys 40, 50 is normally raised for stabilization, a CVT fluid (also for ATF) having a friction coefficient of not smaller than 0.07 is supplied at a rate of not smaller than 300 cc/min. However, since the rolling bearings 11, 21 for bearing the driving and driven pulleys 40, 50, respectively, are disposed on the side of the pulleys 40, 50, respectively, they can be difficultly lubricated thoroughly and are subject to violent vibration due to the resonance of the belt or passage of the elements which are metallic tops, occasionally causing local deterioration of oil film formed on these rolling bearings 11, 21. Accordingly, it is necessary to consider the bearing design such as increase of the supplied amount of lubricant, increase of the bearing size and increase of the ball diameter for the purpose of increasing basic dynamic nominal load.

The recent trend is that a CVT fluid having a raised fluidity and a reduced viscosity is used to provide the belt-type continuously variable transmission 1 with a desired efficiency and suppress the noise occurring in operation while inhibiting the abrasion on the driving and driven pulleys 40, 50 and the metal belt with pieces 60. Therefore, it is thought that standard rolling bearings suffer early exfoliation due to insufficient oil formation attributed to slippage between bearing ring and rolling elements combined with violent axial vibration accompanying the belt resonance. However, a rolling bearing having an inner ring, an outer ring and rolling elements made of ordinary bearing steel is operated at a bearing temperature of higher than 100° C. lubricated with a low viscosity CVT fluid (dynamic viscosity of basic oil: 40 mm$^2$/sec or less at 40° C. or 10 mm$^2$/sec or less at 100° C.). Thus, the amount of lubricant to be supplied into the interior of the bearing falls below the expected value (mallubrication). FIG. 2 is a graph illustrating the fatigue pattern of a belt-type continuously variable transmission. FIG. 3 is a graph illustrating the fatigue of an ordinary T/M bearing. Due to this mallubrication, belt-type continuously variable transmissions exhibit a surface fatigue of higher than 2.0 in a short period of time. This is attributed to the fact that the effect of slippage such as differential movement, revolution and spin causes break of oil film and thus makes the raceway surface fresh, accelerating fatigue. This early fatigue has made the related art belt-type continuously variable transmissions disadvantageous in respect to occurrence of early exfoliation.

The analysis of the aforementioned fatigue is conducted on the basis of fatigue parameter F ($=\Delta B + K \times \Delta RA$ (in which $\Delta B$ represents the reduction of half-width, K represents a constant depending on the material used, and $\Delta RA$ represents the reduction of retained austenite) as disclosed in JP-B-63-34423. In some detail, X-ray diffraction half-width of martensite phase and retained austenite content (vol-%) before and after fatigue of the rolling portion of the metallic material are measured. From these measurements are then determined the difference $\Delta RA$ between retained austenite content (vol-%) before fatigue and retained austenite content after fatigue and the difference $\Delta B$ between X-ray diffraction half-width of martensite phase before fatigue and X-ray diffraction half-width of martensite phase after fatigue. These values are then substituted in the aforementioned equation, respectively, to determine the fatigue parameter. The fatigue parameter thus determined is then evaluated on the previously prepared criterion depending on the various sites of the rolling portion to effect analysis.

Further, the local break of oil film on the contact surface of the raceway with the rolling elements results in the exposure of highly active fresh surface where the additives, etc. in the lubricant exert catalytic action that causes the decomposition of the lubricant or water content in the lubricant to hydrogen which then penetrates and diffuses in the steel and is accumulated in the stress sites (sites in the vicinity of the maximum shear stress in the surface layer) to drastically deteriorate the resistance of the steel. FIG. 4 indicates the measurements of the amount of hydrogen in the balls before and after rotation of deep-groove ball bearing 6206 made of steel with a commercially available CVT fluid at a high temperature (120° C.) for a predetermined period of time. It can be recognized that hydrogen penetrates in the steel material during rotation.

In order to prevent the penetration of hydrogen, the formation of an Ni deposit on the rolling surface has been proposed (see Society of Automotive Engineers of Japan, Inc.'s Symposium Preprint No. 30-02, pp. 5–8, 2002). However, since an Ni deposit is soft, it is thought that the Ni deposit falls off the steel due to abrasion and thus cannot exert its effect sufficiently under conditions that a lubricant having a low viscosity is used to cause break of oil film due to violent vibration, load variation, slippage, etc.

As the rolling bearings 11, 21 to be incorporated in the belt-type continuously variable transmission 1 there have heretofore been used ones formed by inner ring, outer ring and balls obtained by subjecting SUJ2 to hardening and tempering to HTC of from 58 to 64. However, these rolling bearings are subject to early exfoliation as mentioned above. The present applicant early proposed a rolling bearing for belt-type continuously variable transmission having an exfoliation resistance improved by forming inner ring, outer ring and rolling elements by a steel material having finely divided molybdenum-based carbides or vanadium-based carbides separated out in dispersion therein and hence less occurrence of eutectic carbides (see JP-A-2000-328203).

However, the demand for further enhancement of the belt-type continuously variable transmission 1 is inevitable. There has been a growing demand for excellent exfoliation resistance of various rolling bearings to be incorporated in the belt-type continuously variable transmission 1. It has been further required that exfoliation due to penetration of hydrogen be coped with sufficiently.

SUMMARY OF THE INVENTION

The present invention has been worked out under these circumstances. An aim of the present invention is to prevent early exfoliation of a rolling bearing for belt-type continuously variable transmission with a metal belt including pieces.

In order to accomplish the aforementioned aim of the present invention, the present invention lies in a rolling bearing for (belt-type) continuously variable transmission with a metal belt including pieces having an inner ring; an outer ring; and rolling elements, wherein at least one of the inner ring, the outer ring and the rolling element is made of an iron alloy having a chromium content of from 2.5 to 20.0% by weight.

Chromium is an element which enhances hardenability and accelerates spherodizing of carbide, exerting an effect of enhancing the texture stability and inhibiting the surface fatigue. In the present invention, it was found that when chromium is incorporated in an amount of from 2.5 to 20.0% by weight, the surface fatigue of the aforementioned rolling bearing for belt-type continuously variable transmission with a metal belt including pieces can be more effectively inhibited. As a result, even in an environment where CVT fluid is not sufficiently supplied for lubrication, the exfoliation life of the bearing can be prolonged, eliminating the necessity of increasing the size of the bearing and making it possible to secure optimum durability. In some detail, even when the bearing cannot be lubricated as sufficiently as not smaller than 20 cc/min, the surface fatigue can be inhibited, making it possible to accomplish both size reduction and rigidity rise. As a result, the abnormal friction of the metal belt including pieces with both driving pulley and driven pulley due to maldistributed contact can be prevented without increasing the size of the system. Further, the amount of penetration of hydrogen can be reduced, making it possible to inhibit exfoliation due to hydrogen brittleness.

In the above construction, it is preferable that the iron alloy has a carbon content of from 0.50 to 1.20% by weight and a surface hardness Hv of from not smaller than 650 to not greater than 850.

It is also preferable that the iron alloy is subjected to hardening and tempering.

In the above construction, it is preferable that the iron alloy has a carbon content of from 0.10 to 0.90% by weight and a surface hardness Hv of from not smaller than 700 to not greater than 900.

It is also preferable that the iron alloy is subjected to carburizing or carbonitriding and hardening/tempering.

In the above construction, it is preferable that the iron alloy is obtained by subjecting a steel material having: a carbon content of from 0.1 to 0.9% by weight of carbon; the chromium content of from 2.5 to 8.0% by weight; a manganese content of from 0.1 to 2.0% by weight; a silicon content of from 0.1 to 1.5% by weight; a molybdenum content of not greater than 3.0% by weight; a vanadium content of 2.0% by weight; a nickel content of not greater than 2.0% by weight; and iron and obligatory impurities as a remaining material to carburizing or carbonitriding and hardening/tempering, contains carbon and nitrogen in the surface thereof in a total amount of from 1.0 to 2.5% by weight, has a retained austenite content of from 15 to 45% by volume and a surface hardness HRC of not smaller than 60, and is used under being lubricated with a lubricant having a dynamic viscosity of not greater than 8 mm$^2$/s at 100° C.

It is also preferable that the rolling bearing for belt-type continuously variable transmission with the metal belt including pieces according to the above construction, which is used under being lubricated with a lubricant having a traction coefficient of not smaller than 0.10.

It is also preferable that the iron alloy has a sulfur content of not greater than 0.008% by weight and an A-based inclusion rating No. of A (Thin)≦1.5, A (Heavy)≦1.0 as determined according to ASTM E45.

It is also preferable that a compressive residual stress of not smaller than 150 MPa is provided on the surface thereof.

DETAILED DESCRIPTION OF THE PREFERRED EMBODIMENTS

Figure 1:
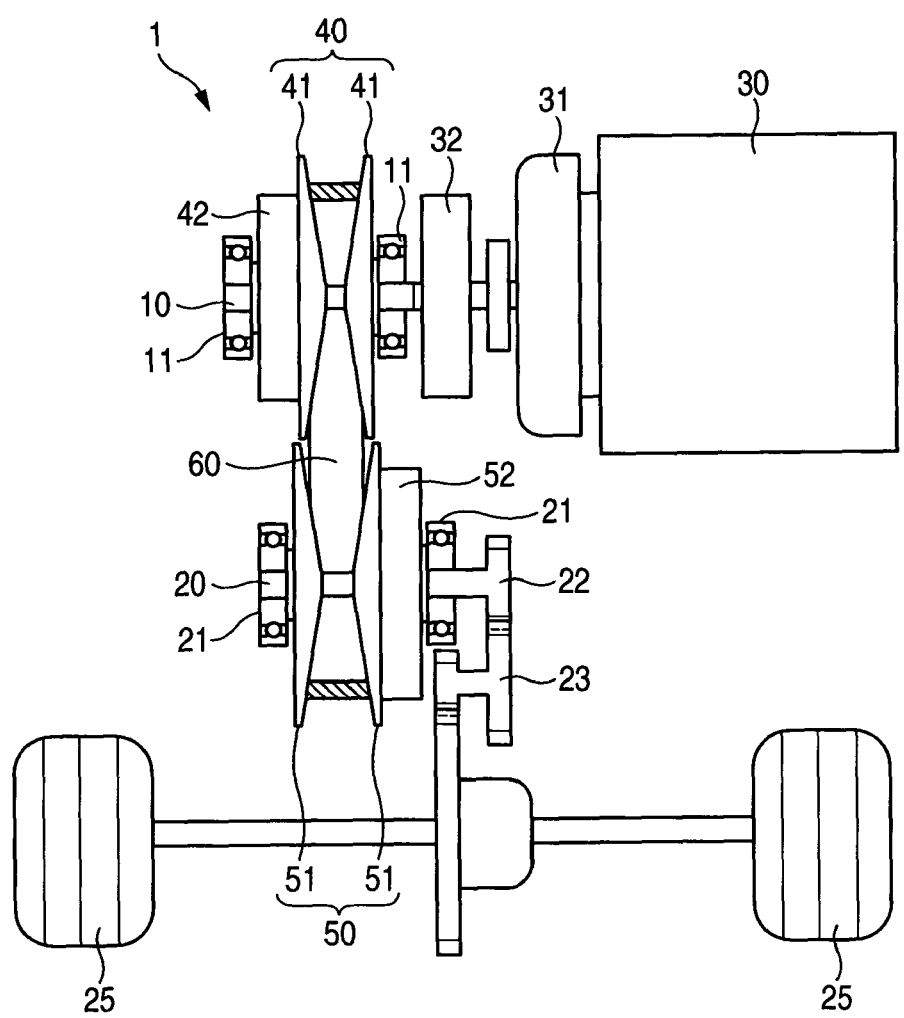
FIG. 1 is a schematic diagram illustrating the structure of an example of belt-type continuously variable transmission.
Figure 2:
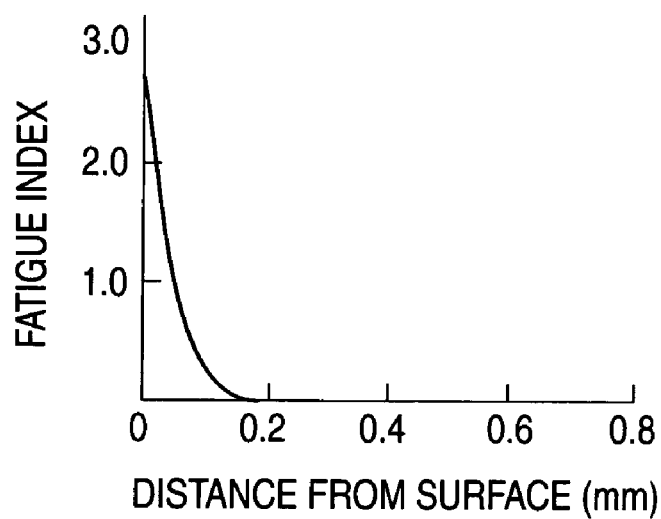
FIG. 2 is a graph illustrating the fatigue pattern of a belt-type continuously variable transmission.
Figure 3:
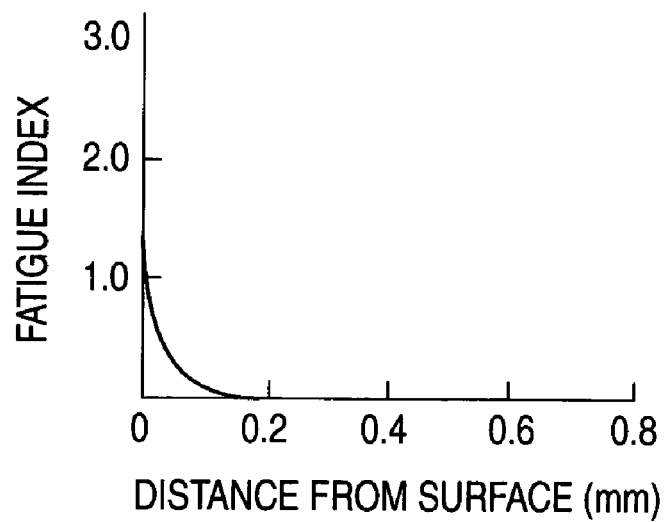
FIG. 3 is a graph illustrating the fatigue pattern of an ordinary T/M bearing.
Figure 4:
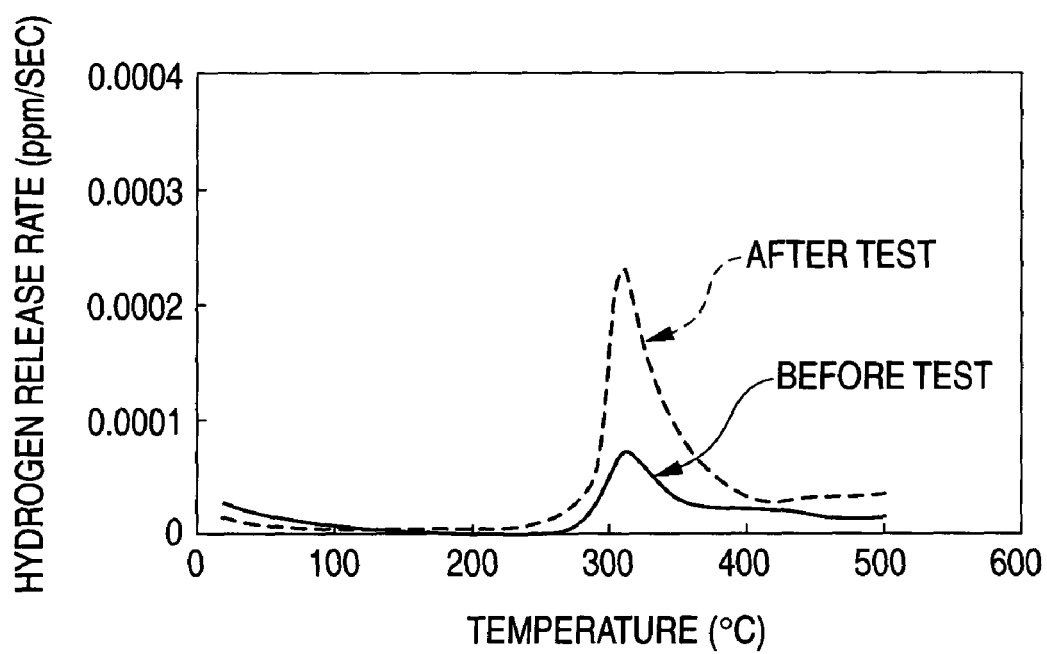
FIG. 4 is a graph illustrating the measurements of the amount of hydrogen in a steel by a rotary test lubricated with an ordinary CVT fluid.

The bearing for belt-type continuously variable transmission of the present invention will be further described hereinafter.

In the bearing for belt-type continuously variable transmission of the present invention, at least one, preferably all, of its inner ring, outer ring and rolling element is formed by an iron alloy having a chromium content of from 2.5 to 20.0% by weight. The alloy composition will be further described hereinafter.

Chromium is an element which enhances hardenability and accelerates spherodizing of carbide. In other words, chromium acts to undergo solid solution in a matrix and hence enhance the hardenability, resistance to temper softening and corrosion resistance as well as fatigue life thereof. Chromium is also an element which makes it substantially difficult for a penetrating solid-solution element such as carbon and nitrogen to move to stabilize the matrix texture, drastically inhibiting the deterioration of life during penetration of hydrogen. Chromium also acts to cause carbides having a higher hardness such as $(Fe, Cr)_3C$, $(Fe, Cr)_7C_3$ and $(Fe, Cr)_{23}C_6$ to be finely distributed in the steel, enhancing the abrasion resistance thereof. In the present invention, chromium is incorporated in the alloy in an amount of not smaller than 2.5% by weight to enhance the texture stability and hence inhibit the surface fatigue of the alloy in an environment subject to metallic contact. However, when the chromium content is too great, the resulting alloy exhibits deteriorated cold-workability, grindability and carbonitridability that drastically adds to cost or has coarse eutectic carbides formed therein that drastically deteriorate the fatigue life or strength thereof. In some detail, when chromium is incorporated in the alloy in an amount of greater than 20.0% by weight, coarse chromium carbides can separate out to give starting points of deterioration of life of rolling bearing or deteriorate the grindability of the alloy during working. Further, δ-ferrite can be produced to impair the toughness of the alloy. The chromium content is preferably from 3.0 to 13.0% by weight, more preferably from 4.0 to 13.0% by weight. From the standpoint of workability, the chromium content is preferably not greater than 9.0% by weight. The total content of molybdenum, vanadium and chromium is from 4.0 to 13.0% by weight. From the standpoint of workability, the total content of molybdenum, vanadium and chromium is from 4.0 to 9.0% by weight.

Besides chromium, carbon is preferably incorporated in the alloy in an amount of from 0.50 to 1.20% by weight. Carbon is useful for inclusions that cause deterioration of life due to damage, exfoliation, etc., making it possible to obtain mass-producible materials having little inclusions and a high stability. Carbon also acts to undergo solid solution in a martensite matrix to enhance the hardness and hence strength after hardening and tempering. Carbon further acts to combine with iron, chromium, molybdenum, vanadium or the like to produce carbides that enhance the abrasion resistance of the alloy. Therefore, when the carbon chromium is too small, it takes much time to undergo carburizing or carbonitriding to obtain a sufficient depth of hardened layer, causing drastic cost rise or, in some cases, producing δ-ferrite that deteriorates toughness. On the contrary, when the carbon content is too great, coarse eutectic carbides can be easily produced during steel making, occasionally causing drastic deterioration of fatigue life or strength or drop of forgeability, cold-workability or grindability that adds to cost. In the present invention, carbon is incorporated in the alloy in an amount of from 0.50 to 1.20% by weight, making it possible to adjust the surface hardness Hv after hardening and tempering to a range of from not smaller than 650 to not greater than 850, where sufficient fatigue life and good workability can be given. When the carbon content falls below 0.50% by weight, the surface hardness Hv cannot be adjusted to a range of not smaller than 650. On the other hand, when the carbon content exceeds 1.20% by weight, the resulting alloy exhibits deteriorated workability. Further, coarse carbides can be easily produced, deteriorating the fatigue life and impact load. The surface hardness Hv of the alloy is preferably from not smaller than 700 to not greater than 850, which range means that the carbon content is from not smaller than 0.60 to 0.90%.

In the foregoing description, in order to subject the alloy to hardening and tempering, the alloy is heated to a temperature of from 900° C. to 1,100° C. for 0.5 to 1.0 hour, and then subjected to tempering at a temperature of from 140° C. to 180° C.

By incorporating carbon in the alloy composition in an amount of from 0.10 to 0.90% by weight, preferably from 0.30 to 0.90% by weight, and then subjecting the alloy to carburizing or carbonitriding, hardening and tempering, an alloy having a surface hardness Hv of from not smaller than 700 to not greater than 900 can be obtained. This specification of case hardening is superior to the aforementioned specification in respect to toughness. In this specification of case hardening, the carbon content needs to be not smaller than 0.10% by weight, preferably not smaller than 0.30% by weight to reduce the time required for carbonitriding which is conducted to obtain a hardness required for resistance to rolling fatigue. On the contrary, when carbon is incorporated in the alloy in an amount as great as greater than 0.90% by weight, the advantage of case hardening cannot be made the best use of, making it impossible to provide a sufficient compressive residual stress or causing the deterioration of cracking resistance in the central portion.

In the aforementioned description, carburizing is carried out, e.g., by heating the alloy to a temperature of from 900° C. to 1,100° C. in a carbon atmosphere for 1.0 to 5.0 hours. Alternatively, vacuum carburizing may be effected in an acetylene atmosphere having a low partial pressure. On the other hand, carbonitriding is carried out by heating the alloy to a temperature of from 900° C. to 1,000° C. in an atmosphere containing a carbon source and a nitrogen source for 1.0 to 5.0 hours. Hardening and tempering may be effected in the same manner as carburizing.

Other desirable alloying elements are silicon, manganese, molybdenum, and vanadium. Silicon is a useful element which is incorporated in the alloy as a deoxidizer for steel making as in manganese to enhance the hardenability as in chromium or manganese as well as strengthen the martensite matrix, prolonging the bearing life. Silicon also acts to enhance resistance to temper softening. However, when silicon is incorporated in the alloy in a large amount, the resulting alloy exhibits deteriorated grindability, forgeability and cold-workability. Accordingly, the content of silicon is preferably from 0.1 to 1.5% by weight.

Manganese is an element necessary as a deoxidizer for steel making. Manganese is normally incorporated in the alloy in an amount of not smaller than 0.1% by weight. Manganese undergoes solid solution in a martensite matrix as in chromium to lower Ms point thereof, making it possible to secure a large amount of retained austenite or enhance the hardenability thereof. Thus, when the content of manganese falls below 0.1% by weight, this effect cannot be sufficiently exerted. However, when manganese is incorporated in a large amount, the resulting alloy exhibits deteriorated cold-workability and grindability as well as drastically dropped martensite transformation starting temperature. When subjected to carburizing, such an alloy has a large amount of austenite retained therein and thus exhibits an insufficient hardness. Thus, the upper limit of the manganese content is 1.5% by weight. Accordingly, the content of manganese is preferably from 0.1% by weight to 1.5% by weight.

Molybdenum undergoes solid solution in a martensite matrix as in chromium to enhance the hardenability, resistance to temper softening, corrosion resistance, etc. Molybdenum further forms finely divided carbides that prevent the growth of crystalline particles during heat treatment or stabilize the alloy texture, exerting an effect of prolonging the fatigue life in an environment subject to metallic contact as in chromium. Molybdenum further makes it difficult for penetrating solid solution elements such as carbon and nitrogen to move to stabilize the texture of the alloy, drastically inhibiting the deterioration of the life during the penetration of hydrogen. Moreover, molybdenum acts to form finely divided carbides such as $Mo_2C$, enhancing the abrasion resistance of the alloy. For these reasons, molybdenum is selectively incorporated in the alloy as far as cost permits. However, when molybdenum is excessively incorporated, the resulting alloy exhibits deteriorated cold-workability or grindability that drastically adds to cost or has coarse eutectic carbides formed therein that drastically impair the fatigue life or strength thereof. Accordingly, the upper limit of the molybdenum content is preferably 3.0% by weight.

Vanadium is an element which produces a strong carbide or nitride. Vanadium acts to undergo solid solution in a carbide or form a finely divided carbide or carbonitride such as VC to drastically enhance the strength and abrasion resistance, inhibit the growth of crystalline particles and trap hydrogen which has penetrated in the steel. Vanadium also makes it substantially difficult for penetrating solid solution elements such as carbon and nitrogen to move to stabilize the texture of the alloy, prolonging the fatigue life thereof in an environment subject to metallic contact. Vanadium is also an element which drastically inhibits the deterioration of life during the penetration of hydrogen. For these reasons, vanadium is selectively incorporated as far as cost permits. However, when vanadium is excessively incorporated, the resulting alloy exhibits deteriorated cold-workability or grindability that drastically adds to cost or has coarse eutectic carbides formed therein that drastically impair the fatigue life or strength thereof. Accordingly, the upper limit of the vanadium content is preferably 3.0% by weight.

Oxygen is an element which produces oxide-based inclusions in a steel to form starting points (fish eye) during bending stress fatigue or can be non-metallic inclusions that cause the deterioration of rolling life. Accordingly, the content of oxygen is preferably not greater than 20 ppm.

Phosphorus is an element which deteriorates the rolling life and toughness of steel. Accordingly, the content of phosphorus is preferably not greater than 0.02% by weight.

Sulfur is an element which enhances the grindability of steel but combines with manganese to produce sulfur-based inclusions that deteriorate the rolling life of steel. Accordingly, the content of sulfur is preferably not greater than 0.02% by weight.

The other ingredients are iron and obligatory impurities. However, oxygen and titanium form oxide-based inclusions and titanium-based inclusions that deteriorate the bearing life, respectively. Thus, these ingredients are preferably not incorporated in the alloy as much as possible. The content of oxygen and titanium are preferably not greater than 10 ppm and not greater than 20 ppm, respectively.

A belt-type continuously variable transmission is keenly required to exhibit a high fuel efficiency, a high transmission efficiency, a prolonged judder life, etc. and thus normally employs a lubricant having a low viscosity. A lubricant having a viscosity of not greater than 8 cst at 100° C. and a traction coefficient of not smaller than 0.10 is often used. However, such a low viscosity lubricant can easily cause the aforementioned penetration of hydrogen. Therefore, the bearing for use under such a wet condition is preferably arranged such that at least one of its inner ring, outer ring and rolling bearing is obtained by subjecting a steel material comprising from 0.1 to 0.9% by weight of carbon, from 2.5 to 8.0% by weight of chromium, from 0.1 to 2.0% by weight of manganese, from 0.1 to 1.5% by weight of silicon, not greater than 3.0% by weight of molybdenum, 2.0% by weight of vanadium, not greater than 2.0% by weight of nickel and the remaining material of iron and obligatory impurities to carburizing or carbonitriding and hardening/tempering such that it contains carbon and nitrogen in the surface thereof in a total amount of from 1.0 to 2.5% by weight, has a retained austenite content of from 15 to 45% by volume and exhibits a surface hardness HRC of not smaller than 60.

The action of carbon, chromium, manganese, silicon, molybdenum and vanadium are as defined above. When these ingredients are incorporated in the aforementioned specific amounts, respectively, these synergistic effects can be exerted most effectively to cause less penetration of hydrogen, making it possible to provide the alloy with excellent exfoliation resistance. More preferably, the content of carbon, chromium, manganese and silicon are from 0.3 to 0.7% by weight, from 3.0 to 6.0% by weight, from 0.5 to 1.5% by weight and from 0.1 to 10.7% by weight, respectively. Nickel is a useful element for stabilizing austenite and acts to inhibit the production of δ-ferrite and hence enhance the toughness of the alloy. However, when nickel is incorporated in an amount more than required, a large amount of retained austenite can be produced, making it impossible to obtain a sufficient hardness. Accordingly, the upper limit of the content of nickel is 2.0% by weight.

The steel material having the aforementioned alloy composition is subjected to carburizing or carbonitriding, and then subjected to hardening and tempering so that the total content of carbon and nitrogen in the surface of the final product is adjusted to a range of from 1.0 to 2.5% by weight. Carburizing or carbonitriding is carried out by heating the steel material to a temperature of from about 900° C. to 960° C. in a furnace into which RX gas, an enriched gas and ammonia have been introduced for several hours. When the steel material thus heated is then directly subjected to hardening, the austenite which has so far been present therein grows to a texture having a great particle diameter mainly composed of large retained austenite particles and lens-shaped martensite particles. Such a texture tends to find difficulty in exerting an effect of prolonging the life of the alloy. Therefore, the steel material which has been subjected to carburizing and carbonitriding is kept at a temperature of not higher than A1 transformation point or cooled to room temperature, subjected to hardening at a temperature of from about 820° C. to 860° C., and then finally subjected to tempering at a temperature of from about 160° C. to 200° C. In this manner, a good texture having finely divided carbides or nitrides having a high hardness dispersed uniformly in a matrix texture made of martensite and austenite can be obtained. In order to obtain necessary hardness and retained austenite content and finely divided carbides and carbonitrides in an amount required to eliminate surface damage, it is necessary that the total content of carbon and nitrogen in the surface of the final product be not smaller than 1.0% by weight, preferably not smaller than 1.2% by weight. However, when the carbon content is higher than required, the carbide particles can grow to coarse particles that deteriorate the rolling fatigue life. Accordingly, the total content of carbon and nitrogen is predetermined to be not greater than 2.5% by weight.

The surface of the final product has a surface hardness HRC of not smaller than 60 and a retained austenite content of from 15 to 45% by volume. Retained austenite acts to reduce the surface fatigue of the alloy. The content of retained austenite is preferably not smaller than 20% by volume. However, when the content of retained austenite is too great, the resulting alloy exhibits a lowered hardness or the resulting bearing ring can undergo deformation during incorporation to give a deteriorated assembly. Thus, the content of retained austenite is not greater than 40% by volume. Similarly, the surface hardness HRC is preferably not smaller than 61 to eliminate abrasion or surface fatigue.

It is further desirable that the sulfur content be not greater than 0.008% by weight and the rating No. be [A (Thin)≦1.5, A (heavy)≦1.0] according to ASTM E45 method. Sulfur is one of impurities in steel and normally is present in steel as A-based inclusion such as MnS. An A-based inclusion acts as a chip breaker that improves the grindability of steel and thus is often effectively utilized.

It has so far been thought from the standpoint of life that an A-based inclusion doesn't affect the bearing life too much as B-based inclusion and D-based inclusion do. However, under working conditions that all specific requirements for high temperature, high vibration, high speed and high load should be met as in belt-type continuously variable transmission lubricated with a lubricant having a viscosity of 8 mm$^2$/s at 100° C. and a traction coefficient of not smaller than 0.10, hydrogen is produced in the contact area as mentioned above and an A-based inclusion acts as a hydrogen occlusion site. Since an A-based inclusion is inherently soft itself and thus is not strong enough to withstand shear stress, the presence of a large A-based inclusion causes a slight increase of stress per unit surrounding area and the A-based inclusion undergoes a high stress itself. During this process, hydrogen which has been occluded in the texture is released to the surrounding to reduce the resistance of the surrounding texture, causing plastic flow and deteriorating the life of the bearing. Therefore, in the present invention, the sulfur content is predetermined to be not greater than 0.008% by weight, preferably not greater than 0.005% by weight to reduce the content of sulfides which are A-based inclusions. Among A-based inclusions, A (Heavy) and A (Thin) can be predetermined to be not greater than 1.0 and not greater than 1.5, respectively, according to ASTM E45 method to expect the prolongation of life.

It is further desirable that the surface of the final product be provided with a compressive residual stress of not smaller than 150 MPa. In the case where lubrication is conducted in a lubricant having a traction coefficient of not smaller than 0.10, a high tangential force acts on the contact area of the rolling element with the bearing ring, combined with the reduction of resistance of steel material due to surface fatigue and penetration of hydrogen, causing cracking beginning with the weakest site. This cracking eventually develops to exfoliation. Therefore, in the present invention, the surface layer is preferably provided with a carburized or carbonitrided layer so that it is provided with a compressive residual stress of not smaller than 150 MPa.

While the rolling bearing for belt-type continuously variable transmission of the present invention is made of a steel material having the aforementioned alloy composition, the constitution and structure of the bearing itself are not limited, but the present invention is applied to rolling bearings which have heretofore been used for belt-type continuously variable transmission. A unit which is more subject to generation of powder due to abrasion of the driving and driven pulleys 40, 50 with the metal belt with pieces 60 may comprise a sealing mechanism provided therein so far as it has an extra crosswise space. Examples of the sealing mechanism employable herein include non-contact type metal plate, contact type nitrile or acryl seal, and fluorine seal. It may be properly selected depending on the working temperature, etc.

In general, the retainer employable herein is preferably an iron retainer. However, under higher rotary speed conditions, a plastic retainer can be used to reduce the weight of the bearing and improve the revolution of the rolling elements and hence inhibit the revolutionary slippage, making it possible to further prolong the bearing life.

Further, the bearing clearance may be ordinary (52% of R of inner ring and outer ring grooves (R of groove which gives substantially the same contact pressure on the inner ring and outer ring)). However, the bearing clearance and R of groove of the raceway can be predetermined small to inhibit radial looseness and axial looseness, making it possible to further improve the bearing performance.

The present invention can be applied also to cylindrical roller bearing, taper roller bearing and needle bearing to exert the same effects as mentioned above.

EXAMPLE

The present invention will be further described in the following examples, but the present invention is not limited thereto.

Examples 1 to 26, Comparative Examples 1 to 5

The iron alloys set forth in Table 1 (having the remaining material of iron and obligatory impurities) were each used to prepare inner and outer rings having the same shape as JIS nominal count 6208 (inner diameter φ40 mm×outer diameter φ80 mm×width 18 mm) which were then subjected to heat treatment in the same manner as set forth in Table 2 under the following conditions. These inner and outer rings were then assembled into test bearings. The roughness of the bearings was from 0.01 to 0.03 μmRa as in ordinary cases. As the ball there was used one obtained by subjecting SUJ2 steel to carbonitriding. As the retainer there was used a corrugated press iron retainer.

Heat treatment 1: Heated at 920° C. to 1,060° C., oil-hardened, and tempered at 160° C.

Heat treatment 2: Carburized (Cp=0.8 to 1.2) at 920° C. to 960° C., oil-hardened, and tempered at 160° C.

Heat treatment 3: Carbonitride (Cp=0.8 to 1.2, $NH_3$=3 to 5%) at 920° C. to 960° C., oil-hardened, and tempered at 160° C.

Heat treatment 4: Vacuum-carburized (acetylene: 0.3 to 0.5 torr) at 960° C. to 1,050° C., cooled with $N_2$ gas, and tempered at 160° C.

Subsequently, the test bearings of the examples and comparative examples thus obtained were each tested under the following conditions. In some detail, a single unit of the belt-type continuously variable transmission (B-CVT) shown in FIG. 1 was tested. As rolling bearings 11, 11 for bearing the input side rotary shaft 10, the test bearings were tested under the following conditions. As rolling bearings 21, 21 for bearing the output side rotary shaft 20 there were related art rolling bearings which were each supplied with a lubricant at a rate of 200 cc/min. For the test, 6 units (one for fatigue analysis) were used for each of the test bearings. After the test, the bearings were each examined for occurrence of damage.

Input torque from engine: 200 Nm

Rotary speed: 6,000 $min^{-1}$ for rotary shaft on the input side

Metal belt with pieces: Number of elements (pieces): 300 (steel band: 0.2 mm×10 sheets)

Length of belt: 600 mm

Lubricant: CVT fluid (dynamic viscosity: 85 $mm^2/s$ (40° C.), 7 $mm^2/s$ (100° C.), friction coefficient at a slip rate of 0.5 m/s: 0.013)

Lubrication conditions: 10 cc/min

Bearing temperature: 120° C.

Target time: 1,000 hr

Fatigue analysis: Arbitrarily selected one of the test bearings after 100 hr of elapse was examined Table 2 shows the details of the test bearings thus evaluated and the results of evaluation.

TABLE 1

|  | C | Si | Mn | Cr | Mo | V |
|---|---|---|---|---|---|---|
| Example 1 | 1.15 | 0.99 | 0.31 | 2.51 |  |  |
| Example 2 | 0.70 | 0.12 | 0.33 | 4.00 |  |  |
| Example 3 | 0.60 | 0.25 | 1.49 | 3.05 |  |  |
| Example 4 | 0.90 | 0.52 | 0.51 | 5.01 |  |  |
| Example 5 | 0.70 | 0.98 | 0.46 | 5.02 |  |  |
| Example 6 | 0.65 | 0.97 | 0.78 | 7.01 |  |  |
| Example 7 | 0.68 | 0.99 | 0.55 | 4.01 | 2.52 |  |
| Example 8 | 0.68 | 0.99 | 0.14 | 4.02 | 1.09 |  |
| Example 9 | 0.67 | 0.99 | 0.49 | 3.99 |  | 1.03 |
| Example 10 | 0.65 | 0.99 | 0.49 | 3.00 |  | 2.53 |
| Example 11 | 0.72 | 0.53 | 1.05 | 5.01 | 0.55 | 0.99 |
| Example 12 | 0.71 | 1.50 | 0.51 | 8.97 |  |  |
| Example 13 | 0.69 | 0.54 | 0.78 | 12.99 |  |  |
| Example 14 | 0.58 | 0.51 | 0.48 | 14.90 |  |  |
| Example 15 | 0.51 | 0.52 | 0.28 | 17.96 |  |  |
| Example 16 | 0.89 | 0.49 | 1.23 | 2.50 |  |  |
| Example 17 | 0.33 | 0.31 | 0.58 | 4.02 |  |  |
| Example 18 | 0.40 | 0.30 | 0.58 | 4.11 | 1.99 |  |
| Example 19 | 0.41 | 0.30 | 0.52 | 3.99 |  | 1.56 |
| Example 20 | 0.55 | 0.24 | 0.33 | 5.01 |  |  |
| Example 21 | 0.11 | 0.34 | 0.49 | 3.99 |  |  |
| Example 22 | 0.60 | 0.28 | 0.28 | 7.00 |  |  |
| Example 23 | 0.55 | 0.12 | 0.31 | 13.00 |  |  |
| Example 24 | 0.33 | 0.15 | 0.51 | 19.99 |  |  |
| Example 25 | 0.51 | 0.27 | 0.78 | 3.11 | 0.99 | 0.51 |
| Example 26 | 0.59 | 0.98 | 0.31 | 3.00 | 1.00 |  |
| Comparative Example 1 | 1.01 | 0.25 | 0.31 | 1.47 |  |  |
| Comparative Example 2 | 0.21 | 0.28 | 0.70 | 1.07 |  |  |
| Comparative Example 3 | 0.40 | 0.39 | 0.73 | 1.12 |  |  |
| Comparative Example 4 | 0.20 | 0.29 | 0.68 | 1.10 | 0.25 |  |
| Comparative Example 5 | 0.45 | 0.29 | 0.73 | 1.06 | 0.24 |  |

Note 1)
Unit: % by weight
Note 2)
The other ingredients are iron and obligatory impurities.

TABLE 2

| | Heat treatment | Surface hardness (Hv) | Cr content (wt-%) | Cr + Mo + V content (wt-%) | $FI_{100\ hr}$ | Average life (hr) | $FI_{1000\ hr}$ |
|---|---|---|---|---|---|---|---|
| Example 1 | Heat treatment 1 | 792 | 2.51 | 2.51 | 1.7 | 788 | Not measured |
| Example 2 | Heat treatment 1 | 764 | 4.00 | 4.00 | 1.1 | ≧1,000 | 1.6 |
| Example 3 | Heat treatment 1 | 733 | 3.05 | 3.05 | 1.3 | ≧1,000 | 1.8 |
| Example 4 | Heat treatment 1 | 771 | 5.01 | 5.01 | 1.1 | ≧1,000 | 1.4 |
| Example 5 | Heat treatment 1 | 755 | 5.02 | 5.02 | 1.1 | ≧1,000 | 1.5 |
| Example 6 | Heat treatment 1 | 744 | 7.01 | 7.01 | 1.1 | ≧1,000 | 1.4 |
| Example 7 | Heat treatment 1 | 757 | 4.01 | 6.53 | 1.0 | ≧1,000 | 1.4 |
| Example 8 | Heat treatment 1 | 759 | 4.02 | 5.11 | 1.1 | ≧1,000 | 1.5 |
| Example 9 | Heat treatment 1 | 749 | 3.99 | 5.02 | 1.1 | ≧1,000 | 1.5 |
| Example 10 | Heat treatment 1 | 751 | 3.00 | 5.53 | 1.1 | ≧1,000 | 1.5 |
| Example 11 | Heat treatment 1 | 741 | 5.01 | 6.55 | 1.1 | ≧1,000 | 1.5 |
| Example 12 | Heat treatment 1 | 753 | 8.97 | 8.97 | 1.0 | ≧1,000 | 1.4 |
| Example 13 | Heat treatment 1 | 742 | 12.99 | 12.99 | 1.1 | ≧1,000 | 1.4 |
| Example 14 | Heat treatment 1 | 721 | 14.90 | 14.90 | 1.2 | ≧1,000 | 1.6 |
| Example 15 | Heat treatment 1 | 663 | 17.96 | 17.96 | 1.3 | ≧1,000 | 1.7 |
| Example 16 | Heat treatment 2 | 812 | 2.50 | 2.50 | 1.6 | 889 | Not measured |
| Example 17 | Heat treatment 2 | 789 | 4.02 | 4.02 | 1.1 | ≧1,000 | 1.5 |
| Example 18 | Heat treatment 3 | 792 | 4.11 | 6.10 | 0.9 | ≧1,000 | 1.2 |
| Example 19 | Heat treatment 3 | 794 | 3.99 | 5.55 | 0.9 | ≧1,000 | 1.2 |
| Example 20 | Heat treatment 3 | 845 | 5.01 | 5.01 | 0.9 | ≧1,000 | 1.2 |
| Example 21 | Heat treatment 2 | 767 | 3.99 | 3.99 | 1.1 | ≧1,000 | 1.5 |
| Example 22 | Heat treatment 4 | 802 | 7.00 | 7.00 | 0.9 | ≧1,000 | 1.1 |
| Example 23 | Heat treatment 4 | 798 | 13.00 | 13.00 | 0.9 | ≧1,000 | 1.2 |
| Example 24 | Heat treatment 4 | 745 | 19.99 | 19.99 | 0.9 | ≧1,000 | 1.1 |
| Example 25 | Heat treatment 2 | 822 | 3.11 | 4.61 | 1.0 | ≧1,000 | 1.5 |
| Example 26 | Heat treatment 3 | 866 | 3.00 | 4.00 | 1.1 | ≧1,000 | 1.5 |
| Comparative Example 1 | Heat treatment 5 | 764 | 1.47 | 1.47 | 2.3* | 50 | Not measured |
| Comparative Example 2 | Heat treatment 3 | 782 | 1.07 | 1.07 | 2.2* | 61 | Not measured |
| Comparative Example 3 | Heat treatment 3 | 794 | 1.12 | 1.12 | 2.1* | 56 | Not measured |
| Comparative Example 4 | Heat treatment 3 | 795 | 1.10 | 1.35 | 2.1* | 71 | Not measured |
| Comparative Example 5 | Heat treatment 3 | 802 | 1.06 | 1.30 | 2.2* | 62 | Not measured |

Note)
*: Value obtained after 30 minutes of passage

The test bearings of Examples 1 to 26 each comprise inner and outer rings made of iron alloy containing chromium in an amount of from 2.5 to 20.0% by weight. All these test bearings exhibited a longer life than those of Comparative Examples 1 to 5. These inventive test bearings except Examples 1 and 16 showed no exfoliation even after 1,000 hours of elapse and exhibited a surface fatigue $FI_{100\ hr}$ as small as not greater than 1.3 after 100 hours of elapse and a surface fatigue $FI_{1000\ hr}$ as small as not greater than 1.8 after 1,000 hours of elapse. Even the test bearings of Examples 1 and 16 exhibited a surface fatigue $FI_{100\ hr}$ of not greater than 1.7, which is considerably smaller than those of Comparative Examples 1 to 5 (surface fatigue after 30 hours of elapse). The results of the evaluation of Examples 1 and 16 give a conclusion that the lower limit of chromium content is 2.5% by weight.

On the contrary, the test bearings of Comparative Examples 1 to 5 comprise inner and outer rings made of SUJ2 (Comparative Example 1), SCR420 (Comparative Example 2), SCR440 (Comparative Example 3), SCM420 (Comparative Example 4) and SCM445 (Comparative Example 5). All these comparative test bearings were damaged in 100 hours. These comparative test bearings exhibited a surface fatigue as high as 2.1 to 2.3 already after 30 hours of elapse.

Examples 27 to 34, Comparative Examples 6 to 12

The iron alloys set forth in Table 3 (having the remaining material of iron and obligatory impurities) were each used to prepare inner and outer rings having the same shape as JIS nominal count 6208 (inner diameter φ40 mm×outer diameter φ80 mm×width 18 mm) which were then subjected to through hardening for B-1 and B-5 and carbonitriding for the others under the following conditions. These inner and outer rings were then assembled into test bearings. The radius of curvature of the bearing ring was from 50.5 to 51.5% of the diameter of the ball, and the roughness of the bearings was from 0.01 to 0.03 μmRa as in ordinary cases. As the ball there was used one obtained by subjecting SUJ2 steel to carbonitriding. As the retainer there was used a corrugated press iron retainer.

Through hardening: Heated at 830° C. to 860° C., oil-hardened, and tempered at 160° C. to 180° C.

Carbonitriding: Carbonitrided at 920 C. to 960 C. (Cp −0.8 to 1.2, NH3=3 to 5%), oil-hardened, and tempered at 160° C. to 180° C.

Subsequently, the test bearings of the examples and comparative examples thus obtained were each tested under the following conditions. In some detail, a single unit of the belt-type continuously variable transmission (B-CVT) shown in FIG. 1 was tested. As rolling bearings 11, 11 for bearing the input side rotary shaft 10, the test bearings were tested under the following conditions. As rolling bearings 21, 21 for bearing the output side rotary shaft 20 there were related art rolling bearings which were each supplied with a lubricant at a rate of 200 cc/min. For the test, 6 units (one for fatigue analysis) were used for each of the test bearings. After the test, the bearings were each examined for occurrence of damage.

Input torque from engine: 200 Nm

Rotary speed: 6,000 min$^{-1}$ for rotary shaft on the input side

Metal belt with pieces: Number of elements: 300 (steel band: 0.2 mm×10 sheets)

Length of belt: 600 mm (100° C.), traction coefficient at 110° C. sip rate of 0.5 m/s: 0.14) (represented by "#3" in Table 4)

Lubrication conditions: Rolling bearing for input side rotary shaft (10 cc/min)

Bearing temperature: 110° C.

Table 4 shows the results of life test on the test bearings made of B-1 and B-5 (which are both made of SUJ2) in Table 3 with the lubricants (1) to (3). When the lubricant (1) was used, all these test bearings showed a life as much as twice the calculated life (Lcal). However, when the lubricants (2) and (3) having a traction coefficient of greater than 0.1 were used, the bearing life was drastically deteriorated. All these test bearings were damaged before the calculated life. The calculated life was determined from the dynamic nominal load and the actual load of the bearing.

TABLE 3

| Material No. | C (wt-%) | Si (wt-%) | Mn (wt-%) | Cr (wt-%) | Mo (wt-%) | V (wt-%) | Ni (wt-%) | S (wt-t) | A-based inclusion Rating No. Thin | A-based inclusion Rating No. Heavy |
|---|---|---|---|---|---|---|---|---|---|---|
| A-1 | 0.18 | 0.25 | 0.58 | 2.50 | — | — | — | 0.003 | 1.0 | 0.5 |
| A-2 | 0.36 | 0.30 | 1.02 | 3.01 | — | — | — | 0.005 | 1.5 | 0.5 |
| A-3 | 0.40 | 0.31 | 0.98 | 4.03 | — | — | — | 0.008 | 1.5 | 1.0 |
| A-4 | 0.41 | 0.29 | 0.93 | 5.02 | — | — | — | 0.005 | 1.5 | 0.5 |
| A-5 | 0.39 | 0.30 | 0.99 | 7.03 | — | — | — | 0.003 | 1.0 | 0.5 |
| A-6 | 0.40 | 0.31 | 0.96 | 3.01 | 1.02 | — | — | 0.001 | 1.0 | 0.0 |
| A-7 | 0.38 | 0.28 | 0.88 | 4.03 | — | 1.01 | — | 0.002 | 1.0 | 0.0 |
| A-8 | 0.45 | 0.33 | 0.29 | 5.01 | — | — | 1.49 | 0.002 | 1.0 | 0.0 |
| B-1 | 1.01 | 0.26 | 0.40 | 1.49 | — | — | — | 0.006 | 1.0 | 0.5 |
| B-2 | 0.20 | 0.28 | 0.75 | 1.04 | — | — | — | 0.005 | 1.0 | 0.5 |
| B-3 | 0.41 | 0.31 | 0.89 | 2.06 | — | — | — | 0.006 | 1.5 | 1.0 |
| B-4 | 0.47 | 0.33 | 0.88 | 8.23 | — | — | — | 0.004 | 1.5 | 0.5 |
| B-5 | 1.03 | 0.25 | 0.38 | 1.46 | — | — | — | 0.014 | 2.5 | 1.5 |
| B-6 | 0.44 | 0.39 | 0.98 | 4.00 | — | — | — | 0.07 | 2.5 | 2.0 |
| B-7 | 0.39 | 0.25 | 0.78 | 5.09 | — | — | — | 0.014 | 2.5 | 2.0 |

Note)
The other ingredients are iron and obligatory impurities.

TABLE 4

| Material No. | Heat treatment | Lubricant | Surface C + N % | Surface hardness (HRC) | Residual γ (%) | Results of life test L/Lcal |
|---|---|---|---|---|---|---|
| B-1 | Through hardening | #1 | 1.01 | 61.8 | 9 | >2.0 |
| B-1 | Through hardening | #2 | 1.01 | 61.8 | 9 | 0.9 |
| B-1 | Through hardening | #3 | 1.01 | 61.8 | 9 | 0.3 |
| B-5 | Through hardening | #1 | 1.03 | 61.6 | 8 | >2.0 |
| B-5 | Through hardening | #2 | 1.03 | 61.6 | 8 | 0.7 |
| B-5 | Through hardening | #3 | 1.03 | 61.6 | 8 | 0.1 |

Lubricant (1): Commercially available turbine oil (VG68) (dynamic viscosity: 68 mm$^2$/s (40° C.), 8 nm$^2$/s (100° C.), traction coefficient at 110° C. sip rate of 0.5 m/s: not greater than 0.09) (represented by "#1" in Table 4)

Lubricant (2): Commercially available CVT fluid (dynamic viscosity: 30 to 40 mm$^2$/s (40° C.), 7 mm$^2$/s (100° C.), traction coefficient at 110° C. sip rate of 0.5 m/s: 0.12) (represented by "#2" in Table 4)

Lubricant (3): Commercially available CVT fluid (dynamic viscosity: 30 to 40 mm$^2$/s (40° C.), 7 mm$^2$/s The test bearings made of iron alloys set forth in Table 1 were each subjected to life test with the lubricant (3). The results are set forth in Table 5. The test bearings of Examples 27 to 34 all exhibited a longer life than those of Comparative Examples 6 to 12. In particular, the test bearings of Examples 30 to 34 exhibited a life as long as twice the calculated life. The test bearings of Comparative Examples 6 to 12 exhibited a life falling below the calculated life.

TABLE 5

| Example/Comparative Example | Test No. | Material No. | Heat treatment | Surface C % | Surface N % | Surface C + N % | Surface hardness (HRC) | Residual γ (%) | Compressive residual stress (Mpa) | Results of life test L/Lcal |
|---|---|---|---|---|---|---|---|---|---|---|
| Example | Example 27 | A-1 | Carbonitriding | 0.97 | 0.11 | 1.08 | 61.8 | 20 | 160 | 1.7 |
| | Example 28 | A-2 | Carbonitriding | 1.08 | 0.13 | 1.21 | 62.3 | 23 | 240 | 1.9 |
| | Example 29 | A-3 | Carbonitriding | 1.24 | 0.19 | 1.43 | 63.2 | 27 | 220 | 1.8 |
| | Example 30 | A-4 | Carbonitriding | 1.37 | 0.21 | 1.58 | 63.8 | 25 | 290 | >2.0 |
| | Example 31 | A-5 | Carbonitriding | 1.54 | 0.26 | 1.80 | 63.6 | 32 | 240 | >2.0 |
| | Example 32 | A-6 | Carbonitriding | 1.45 | 0.25 | 1.70 | 63.7 | 28 | 280 | >2.0 |
| | Example 33 | A-7 | Carbonitriding | 1.39 | 0.29 | 1.68 | 64.1 | 29 | 270 | >2.0 |
| | Example 34 | A-8 | Carbonitriding | 1.45 | 0.20 | 1.65 | 62.9 | 38 | 200 | >2.0 |
| Comparative Example | Comparative Example 6 | B-1 | Through hardening | 1.01 | — | 1.01 | 61.8 | 9 | — | 0.3 |
| | Comparative Example 7 | B-2 | Carbonitriding | 0.89 | 0.10 | 0.99 | 62.2 | 23 | 160 | 0.5 |
| | Comparative Example 8 | B-3 | Carbonitriding | 0.93 | 0.11 | 1.04 | 61.7 | 18 | 170 | 0.7 |
| | Comparative Example 9 | B-4 | Carbonitriding | 0.62 | 0.08 | 0.70 | 57.6 | 6 | 120 | 0.4 |
| | Comparative Example 10 | B-5 | Through hardening | 1.03 | — | 1.03 | 61.6 | 8 | — | 0.1 |
| | Comparative Example 11 | B-6 | Carbonitriding | 1.21 | 0.18 | 1.39 | 63.0 | 26 | 220 | 0.9 |
| | Comparative Example 12 | B-7 | Carbonitriding | 1.29 | 0.20 | 1.49 | 63.2 | 28 | 240 | 1.0 |

In accordance with the present invention having the aforementioned constitution and action, early exfoliation of rolling bearing for belt-type continuously variable transmission with a metal belt with pieces can be inhibited.

What is claimed is:

1. A rolling bearing for continuously variable transmission with a metal belt including pieces comprising:
   an inner ring;
   an outer ring; and
   rolling elements,
   wherein at least one of the inner ring, the outer ring and the rolling element is made of an iron alloy,
   wherein the iron alloy is obtained from a steel material comprising:
   a carbon content of from 0.1 to 0.9% by weight of carbon;
   a chromium content of from 3.01 to 8.0% by weight;
   a manganese content of from 0.1 to 2.0% by weight;
   a silicon content of from 0.1 to 1.5% by weight;
   a molybdenum content of not greater than 3.0% by weight;
   a vanadium content of 2.0% by weight;
   a nickel content of not greater than 2.0% by weight;
   a sulfur content of not greater than 0.008% by weight and an A-based inclusion rating No. of A (Thin)≦1.5, A (Heavy)≦1.0 as determined according to ASTM E45;
   iron and obligatory impurities as a remaining material,
   wherein the steel material restrains a reduction of resistance of surrounding texture of the A-based inclusion,
   and said steel material has been subjected to carbonitriding and hardening/tempering to set the carbon concentration of the surface of the iron alloy to smaller than 1.54%, to set the carbon and nitrogen in the surface thereof in a total amount of from 1.0 to 2.5% by weight, to set a retained austenite content of from 15 to 45% by volume, and to set a surface hardness HRC of not smaller than 60, and is lubricated with a lubricant having a dynamic viscosity of not greater than 8 mm$^2$/s at 100° C., and
   wherein a compressive residual stress of not smaller than 150 MPa is provided on the surface thereof.

2. The rolling bearing for continuously variable transmission with the metal belt including pieces according to claim 1, is lubricated with a lubricant having a traction coefficient of not smaller than 0.10.

* * * * *